Sept. 17, 1968   H. BLACKSTONE ET AL   3,402,290
HOT-BOX DETECTOR
Original Filed Aug. 2, 1957
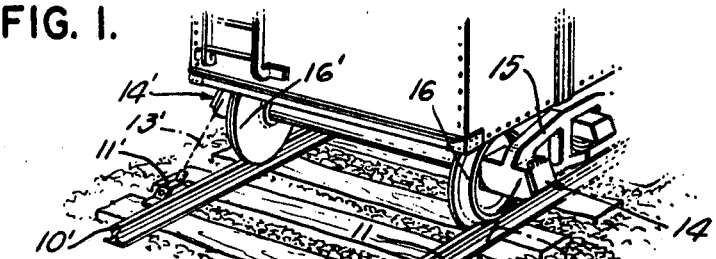
FIG. 1.
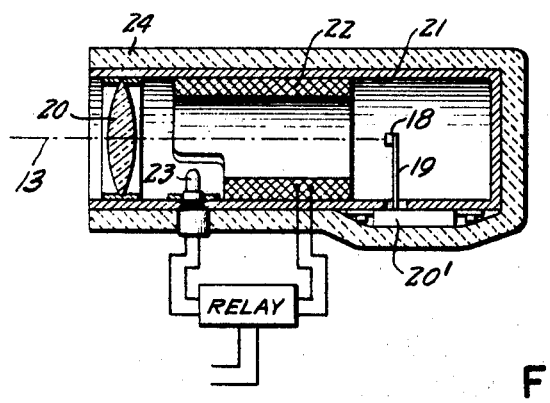
FIG. 2.
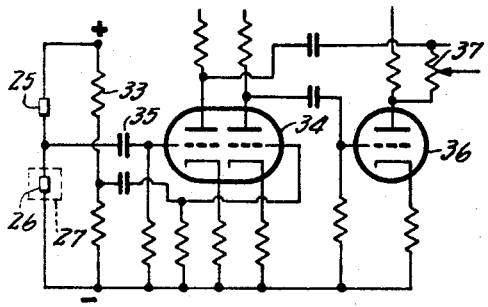
FIG. 3.
FIG. 7.
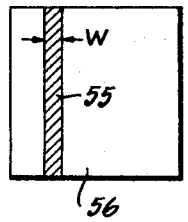
FIG. 8.
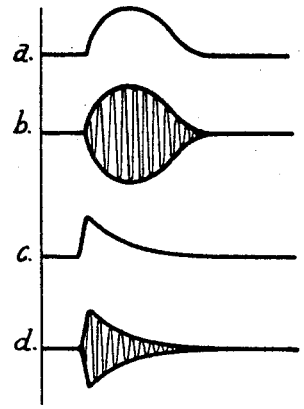
FIG. 4.
FIG. 6.
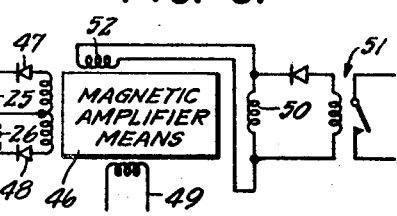
FIG. 5.
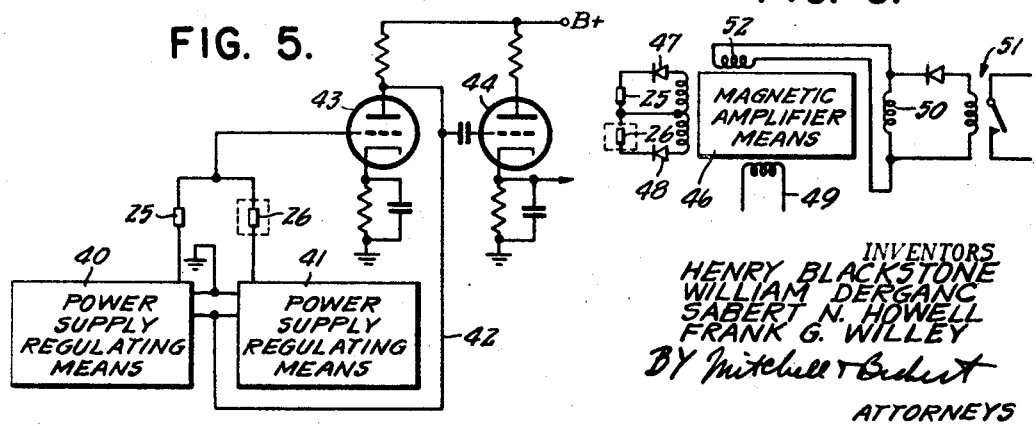
INVENTORS
HENRY BLACKSTONE
WILLIAM DERGANC
SABERT N. HOWELL
FRANK G. WILLEY
BY Mitchell & Bechert
ATTORNEYS United States Patent Office 3,402,290
Patented Sept. 17, 1968

3,402,290
HOT-BOX DETECTOR
Henry Blackstone, Syosset, William Derganc, Centerport, and Sabert N. Howell, Huntington, N.Y., and Frank G. Willey, Saratoga, Calif., assignors to Servo Corporation of America, New Hyde Park, N.Y., a corporation of New York
Continuation of application Ser. No. 438,822, Feb. 24, 1965, now abandoned, which is a continuation of application Ser. No. 675,948, Aug. 2, 1957, which in turn is a continuation-in-part of abandoned application Ser. No. 349,826, Apr. 20, 1953. This application Oct. 7, 1966, Ser. No. 585,209
3 Claims. (Cl. 246—169)

ABSTRACT OF THE DISCLOSURE

This invention relates to an infrared hot-box detector to determine temperatures above a predetermined value. A detector is imaged continuously upon a portion of a moving journal box. Two heat-sensitive detectors are arranged in a bridge circuit, one of which is imaged in the journal box and the other of which provides a compensating effect. These elements are D.C. biased and are capacitance coupled to an amplifier.

---

This application is a continuation of applicants' parent application, Ser. No. 438,822, filed Feb. 24, 1965, now abandoned, which was a continuation of Ser. No. 675,948, filed Aug. 2, 1957, which was a continuation-in-part of Ser. No. 349,826, filed Apr. 20, 1953, now abandoned.

Our invention relates to automatic warning devices, and in particular to a stationary heat-responsive device for observing the passage of axle boxes of railroad rolling stock, for automatic response to excessive temperature observations.

Excessively heated axle boxes known as "hot boxes" have long plagued railroad operators, because it has been difficult, if not impossible, to detect a hot box before its temperature has developed to alarming proportions, and it has been difficult to avoid bearing seizure, with occasional disastrous consequences.

It is, accordingly, an object of the invention to provide improved means for detecting the presence or potential presence of a hot-box problem.

It is a specific object to meet the above object with a device which may be mounted alongside the track, which will be continually on the alert for all passing trains, and which will be so sensitive as to detect an overheated axle box even though the extent of overheating may involve only a relatively slight increase in temperature over the normal running temperature of an axle box; this device is also to be operative regardless of the temperature of the surrounding air and regardless of the speed of the passing train.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a simplified perspective view of a section of railroad right-of-way, showing the outline of a pair of rolling-stock truck wheels with axle boxes, and illustrating the general placement and alignment of a device incorporating features of the invention;

FIG. 2 is an enlarged sectional view of an assembly contained within the detecting device of FIG. 1;

FIGS. 3, 4, 5 and 6 are alternate circuit connections for the detecting means in FIG. 2; and FIGS. 7 and 8 are diagrammatic representations of the functioning of the device of FIG. 2.

Briefly stated, our invention contemplates a warning device which shall be continually alert for fluctuations in the temperature of axle boxes of passing railroad stock. The device may include detecting means responsive to infrared radiations and, therefore, capable of discerning small temperature rises above a given threshold which can be established and certified as a safe operating level for axle boxes. The detecting means may receive energy from infrared-transmitting collecting optics and may thus be completely sealed within a rugged chamber including thermostatically controlled heating means, to keep a level ambient temperature for operation of the detecting element. Various circuit connections lending themselves to the present warning-device application will be described.

Referring to FIG. 1 of the drawings, our invention is shown in application to a warning device contained within a sealed chamber or housing 11 and fixedly mounted alongside a portion of the railroad right-of-way, as upon the ends of cross ties for the spaced rails 10–10'. The device may contain optics shielded from the sun as by a shade 12 and directionally aligned, as on an axis 13, with the level of passing axle boxes 14 on one side of the track. For each point to be protected by a warning device such as the device 11, provision must also be made for observation of axle boxes 14' on the opposite side of the right-of-way, and such duplicate equipment is shown to be of similar construction and, therefore, identified with corresponding, but primed, notation. The boxes 14–14' are supported on opposite ends of the axle common to wheels 16–16', and they may be cradled in or be permanently a part of a truck assembly, as suggested by the side frame 15 for journal box 14. The axis 13 of directional alignment for detector unit 11 is seen to be generally upwardly inclined so as to view the bottoms and corresponding sides of passing journal ends, preferably close to but just outside the side frame 15.

The detection of relatively low temperatures (in the region of 250° F.), and the detection of relatively small temperature changes or increments above a safety threshold in the same region, are perhaps best achieved with a detecting element having a response extending into the far-infrared region, as, for example, into the region from 5 to 25 microns. Such a device may be mounted in a capsule 18 supported on a standard 19 fixed to a base 20, which may contain suitable preamplifier means. In FIG. 2, we show that the assembly 18–19–20 may be adjustably positioned as a unit, as needed for bringing the sensitive elements into proper alignment and focus with respect to collecting optics 20. The collecting optics may comprise a mirror, but in the form shown we illustrate our preference for a glass lens 20' which preferably transmits substantially only radiation in the infrared region. This glass may be of the arsenic-trisulphide variety, and it will be appreciated that by utilizing a lens instead of a mirror for the collecting optics the entire chamber means 21 within which the sensitive cell 18 is contained may be fully sealed. In order that changes in the temperature in the outside air shall have minimum effect on the operations of our device, we show electrical heating means 22 contained within the chamber means 21 and automatically regulated by thermostatic means 23 to maintain substantially uniform temperature within the chamber. If desired, a blanket 24 of insulating material may encase the described parts of FIG. 3, and all the parts of FIG. 2 may be fully contained and within the chamber or housing 11 of FIG. 1.

The sensitive eleemnt at the cell 18 may be one of a variety of known types, but for ruggedness and to suit the present purpose we prefer cells of the type known as thermistors, which may be in the form of thin flakes of negative-resistance material mounted on thermal sinks. In the circuit of FIG. 3, two such elements are shown at 25–26, and dotted lines 27 suggest that the element 26 is shielded from radiations collected by optics 20′, which element 25 is exposed to such radiations. Both elements 25–26 may, however, be contained within the same capsule or cell housing 18.

The cell elements 25–26 may be bridge-connected as shown, and we have provided a rectifier 28 for uniformly biasing the separate cells with respect to ground, as suggested by the capacitance connections 29. The bridge output may be taken at the common connection of the cells with respect to the ground, and we show a single amplifier tube 30 processing this output. Tube 30 may be contained within the preamplifier housing 20 will be understood to be schematically suggestive of the number of stages required to achieve the necessary amplification to operate relay means 31. It will be understood that, upon proper biasing of the cells 25–26 and of the amplifier means 30, relay 31 may be caused to operate as, for example, to actuate a block-signalling circuit upon detection of a passing axle box of slightly elevated abnormal temperature; in FIG. 3, therefore, relay 31 will be understood to be suggestive of remote-signalling or warning means responsive to detected journal temperatures exceeding threshold.

In FIG. 4, we illustrate another circuit connection for detecting elements 25–26, incorporating A.-C. amplification, with a view to eliminating output variations reflecting drift in the power supply. The elements 25–26 are again connected in series and across the biasing power supply, as suggested by the polarity legends. In FIG. 4, the biasing voltage appears across biasing-impedance means 33, and the preamplifier means 34 is a balanced amplifier having two input circuits and two output circuits with matched characteristics. The common pole of the cells 25–26 may be coupled as through capacitance 35 to one input circuit, while the midpoint of biasing-impedance means 33 may be similarly coupled to the other input circuit. Drift fluctuations in one direction in the power supply will produce like variations in the outputs of the two cells; therefore, to eliminate the effects of these variations, we provide phase-inverter means 36 in one of the outputs of the balanced amplifier, so that, when these outputs are combined, as across a summing output potentiometer 37, the drift effects will be neutralized.

In FIGS. 5 and 6, we illustrate automatic methods for reducing the bias on the two detector cells 25–26 in the presence of such enormously excessive radiation as may be radiated by a hot box overheated to the danger point. In both cases, the automatic correction is realized by bleeding a fraction of the output of the amplifier means for use as a feedback control to the biasing power supply. In FIG. 5, separate power-supply-regulating means 40–41 are connected to the two cells in balanced relation with respect to ground, and the feedback voltage is derived in line 42 connected to the output of first stage 43 of amplification. Line 42 is connected in common to both power-supply-regulating means 40–41 (i.e., effectively to the midpoint of the combined means 40–41), and an additional stage of amplification 44 (analogous to the relay 31 of FIG. 3) may function from the output of stage 43.

In FIG. 6, we illustrate the employment of magnetic-amplifier means 46 to supply alternating-current biasing through rectifiers 47–48 to the respective cells 25–26; the biasing connection to amplifier 46 will be understood to include an inductive coupling to a flux path in said amplifier 46. Amplifier means 46 may be energized from a line supply at the winding 49, and output voltage may be picked up by a winding 50 for operation of a relay 51, corresponding to the relay 31 of FIG. 3. In order to provide the overload-compensating effect described in FIG. 5, an auxiliary winding 52 may be energized by the output 50 and connected to the core of the amplifier means 46 in flux-reducing relation with the biasing coupling, so as to reduce the biasing function in the presence of large signals.

The effective area of the cell 25 exposed to radiation may be of the same general proportions as those of a particular area of a journal box to pass the field of view, said particular area being that projected area of box 14 or 14′, as viewed on the axis 13 or 13′, but which extends outwardly of the side frame 15. For most efficient collection of and response to the available energy, the element size, as projected by the optics, should correspond substantially to the said particular area of the axle box. However, since the warning device is for application to trains which may pass the device at any one of a variety of speeds, ranging from full speed to a slow walk, we prefer that the active area of the detecting cell 25, as imaged on axis 13 at the elevation of box 14, shall be substantially less than said particular area of the axle box. In FIG. 7, the cell is shown to have an effective area 55 that is elongated in one direction. Such elongation, when imaged at box 14, preferably is horizontal, i.e., it may correspond roughly to the optically projected horizontal extension of the axle box 14 beyond side frame 15; for simplicity in FIG. 7, the total viewable area 56 of the journal box 14, for the viewing aspect 13, may be considered to be rectangular, with one side of length corresponding to the length of the cell-image area 55. The length-to-width dimensions of the cell area may vary for certain specific applications, but we have illustrated a preference that the width $w$ shall be a small fraction, say of the order of $\frac{1}{8}$ or $\frac{1}{10}$, of the length of the area 56 to be scanned on each passing box 14. This relationship will mean that for each passage of an axle box through the field of view of the optics, the sensitive area of the cell 25 may in effect continuously scan the object or single source 56. If the train is moving past the detector at a high rate of speed, then the pulse produced by the detector output may resemble curve $a$ of FIG. 8 for the case of DC-polarized cells, and curve $b$ may illustrate the appearance of a similarly modulated signal for the case of AC biasing. If the train is moving slowly, then the detector cell 25 may saturate before the axle box has proceeded substantially through the field of view, and the output may appear as at $c$, for the case of DC-polarization, and at $d$, for AC-polarization. It will be seen that by making the detector area of elongated narrow shape, as suggested in FIG. 7, at least one is assured of an output magnitude for slow-moving trains approaching than attainable with the fast-moving trains.

It will be seen that we have described a relatively simple device for automatically generating a signal which can serve for warning purposes if a given relatively low threshold temperature is found to have been exceeded. The thermistor flakes described at 25–26 have the requisite ruggedness and response to handle the full range of operations required of the hot-box warning application, and we have disclosed automatic means for protecting these detector elements in the presence of excessive signals and for assuring uniformity of performance regardless of external temperature variations and power-supply drift fluctuations.

While we have described the invention in detail for the preferred forms shown, it will be understood that modifications may be made within the scope of the invention as described in the claims which follow.

What is claimed is:

1. A railroad hot-box detector system, comprising a length of railroad track in an uncontrolled outdoor environment and comprising spaced rails, rolling stock including opposed outboard journal boxes for the opposite ends of each axle thereof, spaecd wheels on each axle and riding said rails, an infrared-responsive detecting device fixedly mounted on one side of the track, said device comprising bridge circuit means including two sensitive elements electrically responsive to incident infrared radiations, said elements being the active and compensating elements respectively, D.C. biasing means for said elements, optical means included in said device and imaging one of said elements to the exclusion of the other of said elements at a horizontal elevation through which said journal boxes must pass as said rolling stock rolls along said track, whereby infrared radiation from each successively passing journal box on said one side of the track is focused on said one element, said optical means providing continuous exposure of said one element to each passing journal box, the effective imaged area of said detector being a portion only of that part of a journal box exposed at any one time to said detector, and capacitance coupled A.C. amplifying means coupled to said bridge and responsive to an unbalanced bridge condition to thereby provide an output signal.

2. The hot-box detector system of claim 1 in which the imaged area of said sensitive portion is in the order of one-eighth or less of the total journal box area to which said sensitive area is exposed for each passing journal box.

3. The hot-box detector system of claim 1 in which the detectors are in one leg of the bridge, and said D.C. biasing means includes a D.C. power supply having a common terminal, said power supply being in the other leg, said A.C. amplifying means including A.C. coupling means between the common of the power supply and the junction of the two detectors.

References Cited
UNITED STATES PATENTS

| | | | |
|---|---|---|---|
| 2,432,199 | 12/1947 | Kamm | 324—106 X |
| 2,544,017 | 3/1951 | Golicke | 330—143 X |
| 2,565,922 | 8/1951 | Howard | 330—143 X |
| 2,906,957 | 9/1959 | Easter | 324—106 X |
| 3,024,658 | 3/1962 | Huddleston | 324—106 X |
| 3,048,778 | 8/1962 | Rumpel | 324—106 X |

ARTHUR L. LA POINT, *Primary Examiner.*

STANLEY T. KRAWCZEWICZ, *Assistant Examiner.*